United States Patent
Hubbard et al.

(10) Patent No.: US 10,165,022 B1
(45) Date of Patent: Dec. 25, 2018

(54) SCREEN SHARING MANAGEMENT

(71) Applicants: Paul Hubbard, San Diego, CA (US);
Clarence Huang, San Diego, CA (US);
Amir Eftekhari, San Diego, CA (US);
Andrew Jeddeloh, San Diego, CA (US)

(72) Inventors: Paul Hubbard, San Diego, CA (US);
Clarence Huang, San Diego, CA (US);
Amir Eftekhari, San Diego, CA (US);
Andrew Jeddeloh, San Diego, CA (US)

(73) Assignee: Intuit Inc., Mountain View, CA (US)

(*) Notice: Subject to any disclaimer, the term of this patent is extended or adjusted under 35 U.S.C. 154(b) by 120 days.

(21) Appl. No.: 15/143,372

(22) Filed: Apr. 29, 2016

(51) Int. Cl.
*H04L 29/06* (2006.01)
*G06F 3/0481* (2013.01)

(52) U.S. Cl.
CPC .......... *H04L 65/403* (2013.01); *G06F 3/0481* (2013.01); *H04L 63/102* (2013.01)

(58) Field of Classification Search
CPC .... H04L 65/403; H04L 63/102; G06F 3/0481
See application file for complete search history.

(56) References Cited

U.S. PATENT DOCUMENTS

| | | | |
|---|---|---|---|
| 2015/0381931 A1* | 12/2015 | Uhma | H04N 7/147 348/14.03 |
| 2016/0142466 A1* | 5/2016 | Doi | G06F 3/0481 715/738 |
| 2017/0118258 A1* | 4/2017 | Lieb | H04L 65/403 |
| 2017/0213220 A1* | 7/2017 | Tomlinson, Jr. | G06Q 20/4014 |

OTHER PUBLICATIONS

"Chat + Cobrowse: In-Person Experiences for Mobile Customers", Jul. 30, 2015, 7 pages.

* cited by examiner

*Primary Examiner* — Eleni A Shiferaw
*Assistant Examiner* — Cheng-Feng Huang
(74) *Attorney, Agent, or Firm* — Ferguson Braswell Fraser Kubasta PC

(57) ABSTRACT

A method to manage screen sharing includes receiving a screen sharing request of a shareable interface displayed on a first computing device of a first end user, conducting, in response to the session sharing request, an inventory of secured assets in the shareable interface, and generating a shared interface from the shareable interface. Generating the shared interface includes obtaining a first secured asset in the inventory of the secured assets, modifying the first secured asset based on a first end user permission defined for the first secured asset to generate a modified secured asset, and adding the modified secured asset to the shared interface. The method further includes transmitting the shared interface to a second computing device of a second end user.

10 Claims, 9 Drawing Sheets

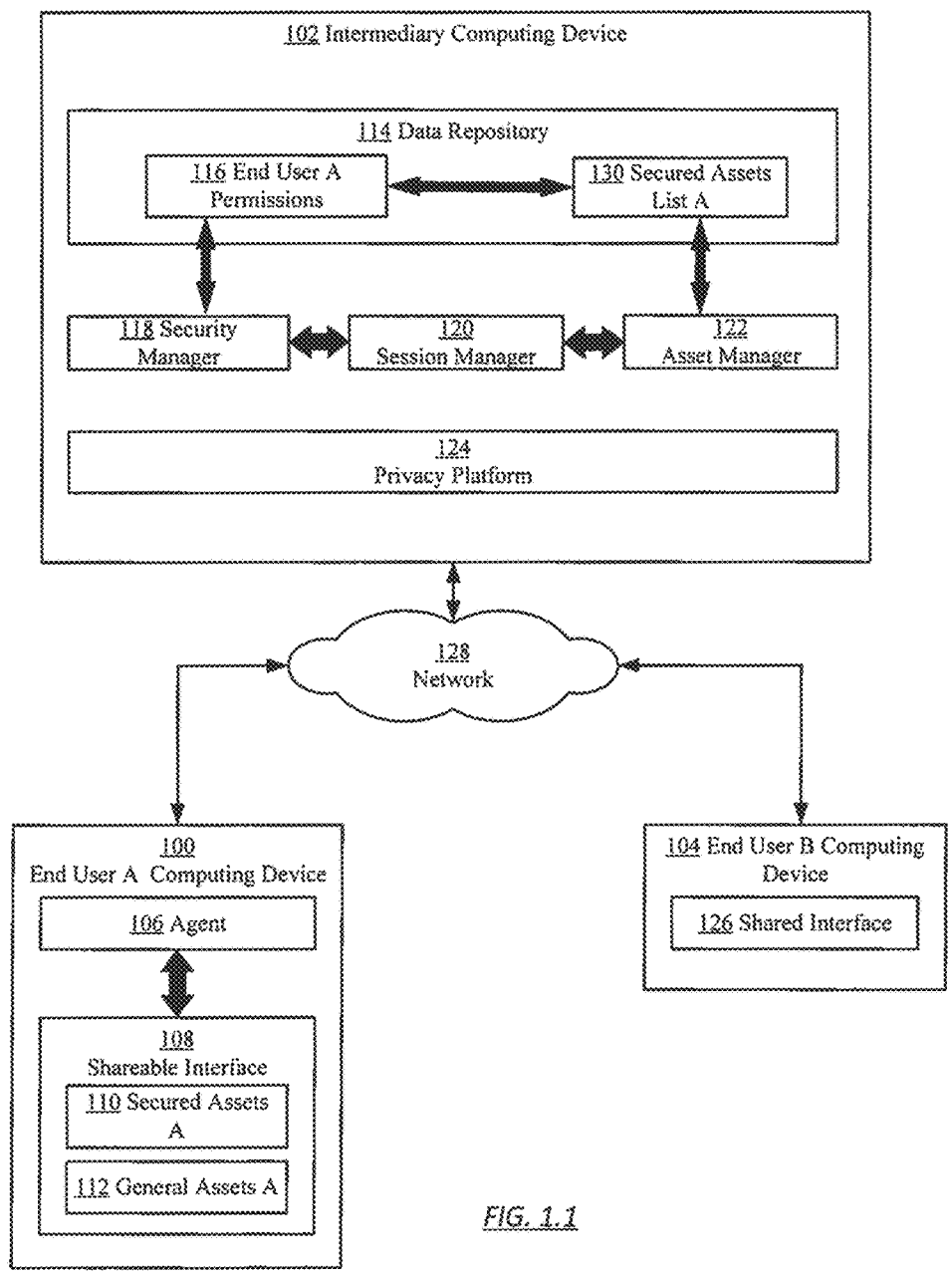
FIG. 1.1

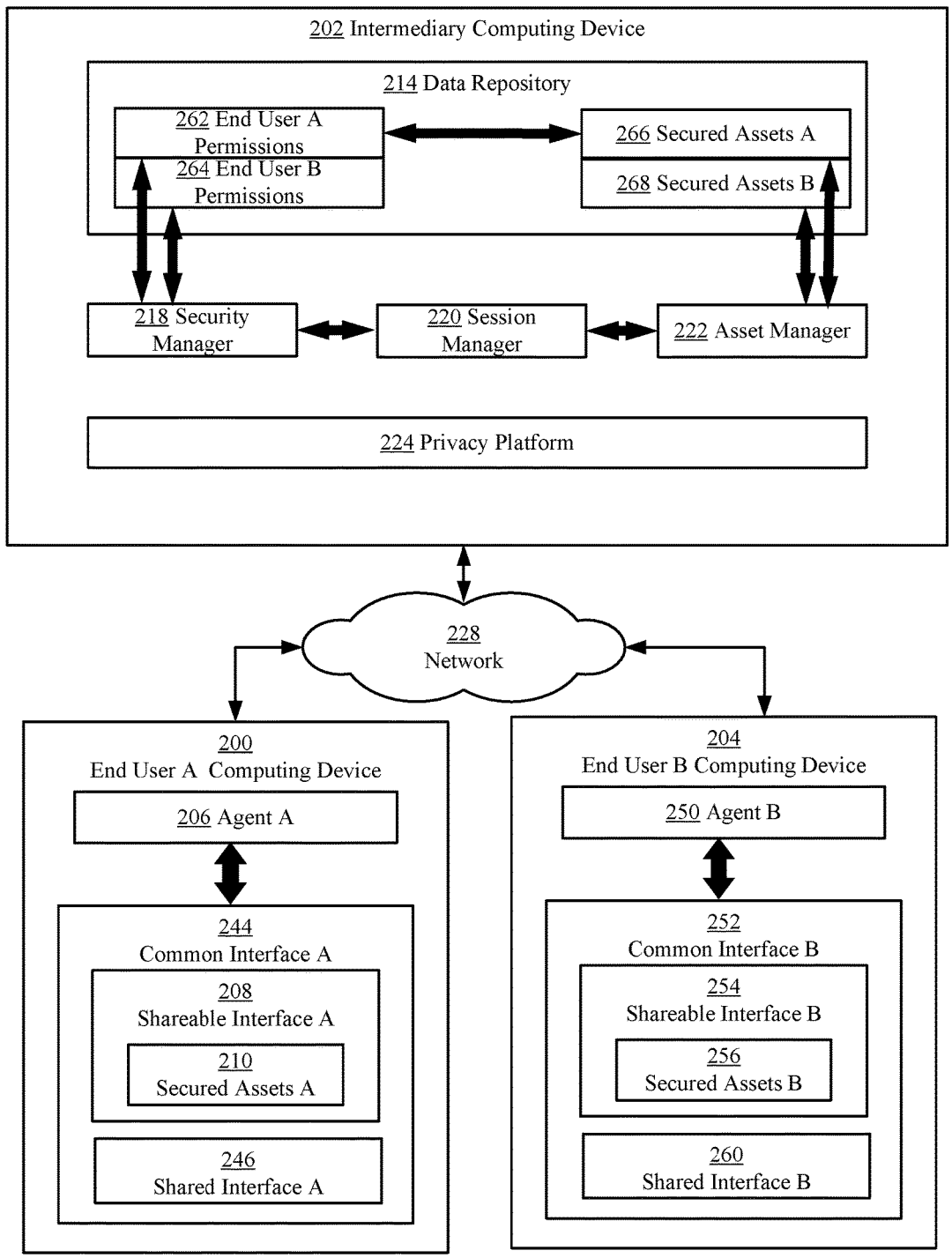
FIG. 1.2

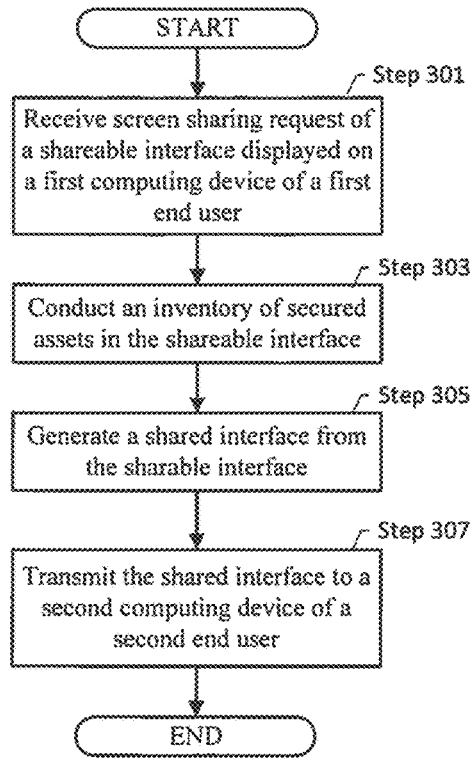
FIG. 3.1
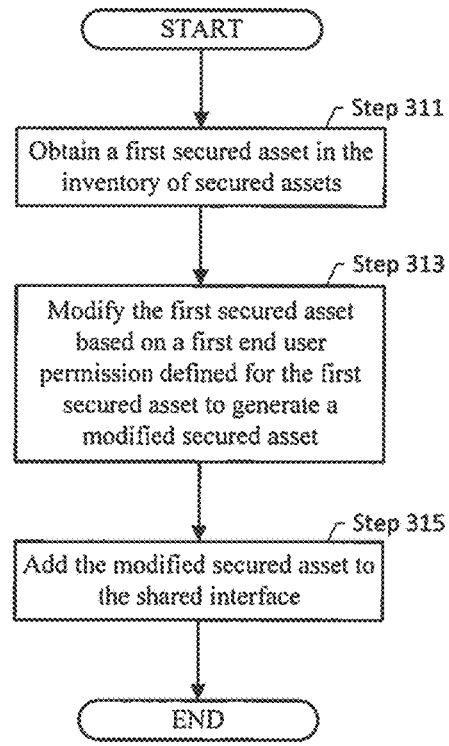
FIG. 3.2

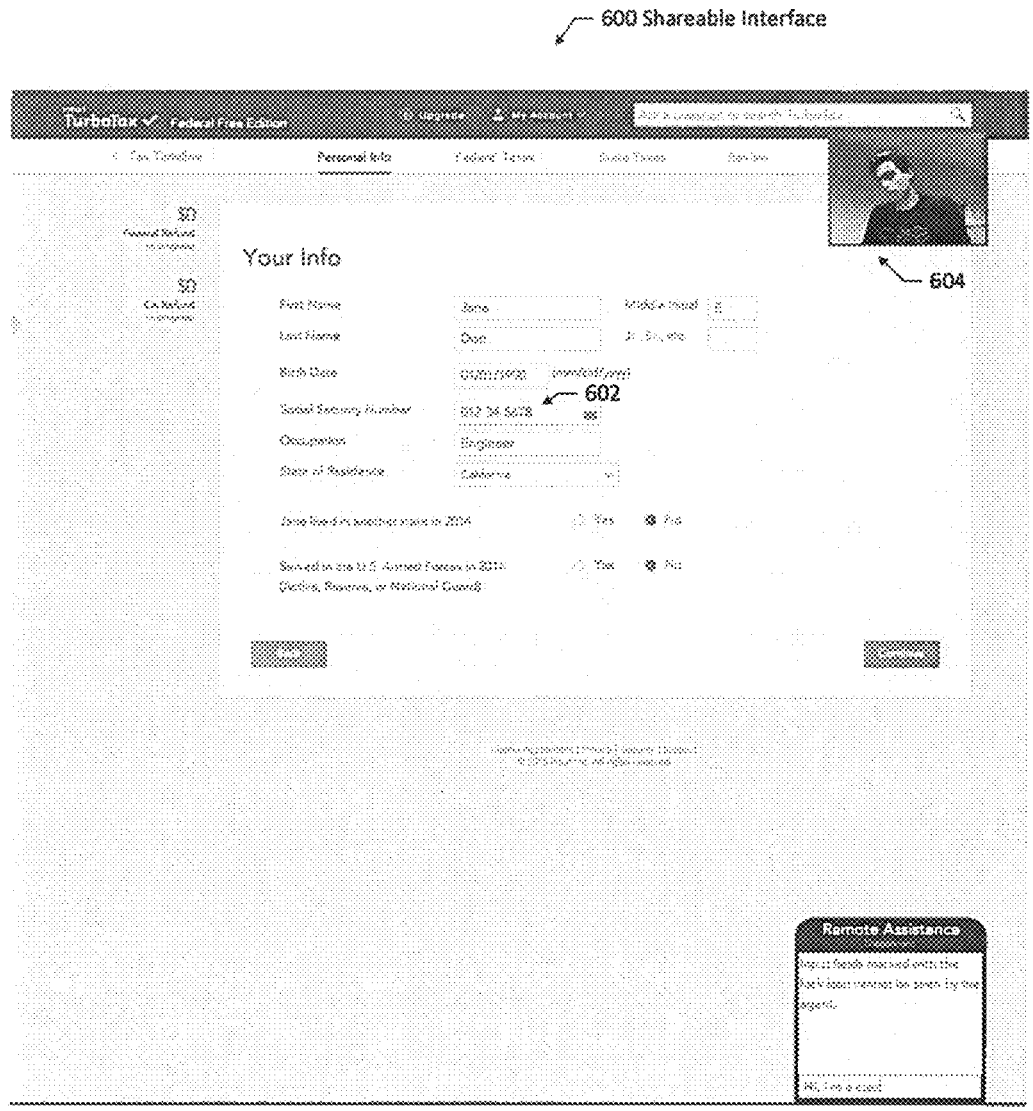
FIG. 6.1

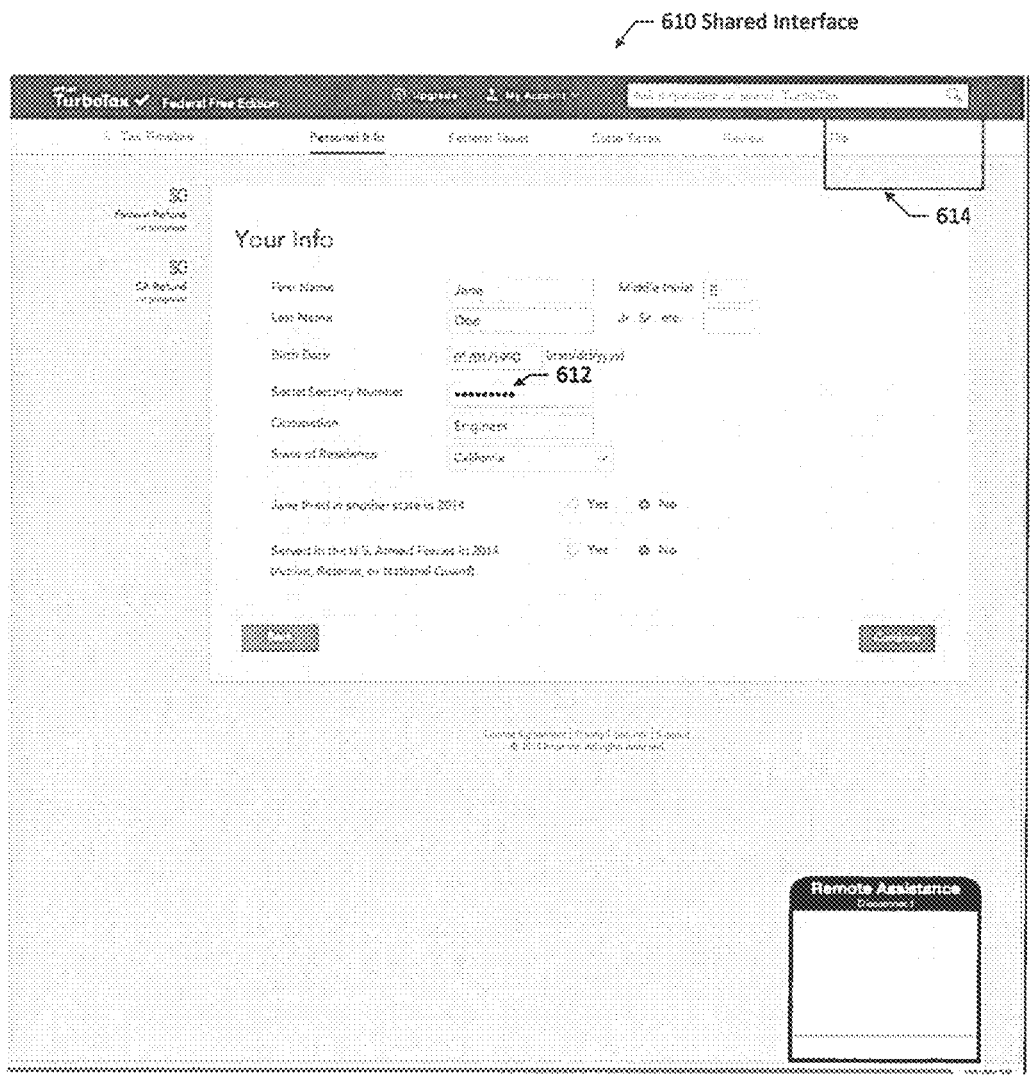
FIG. 6.2

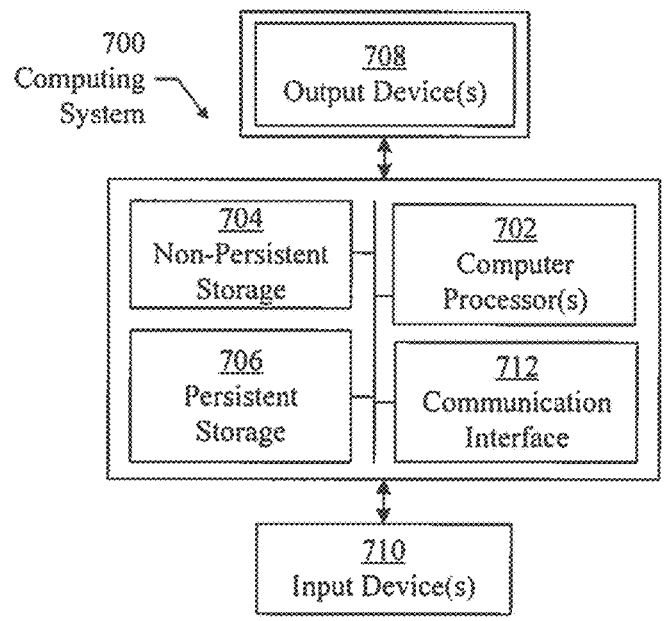
FIG. 7.1
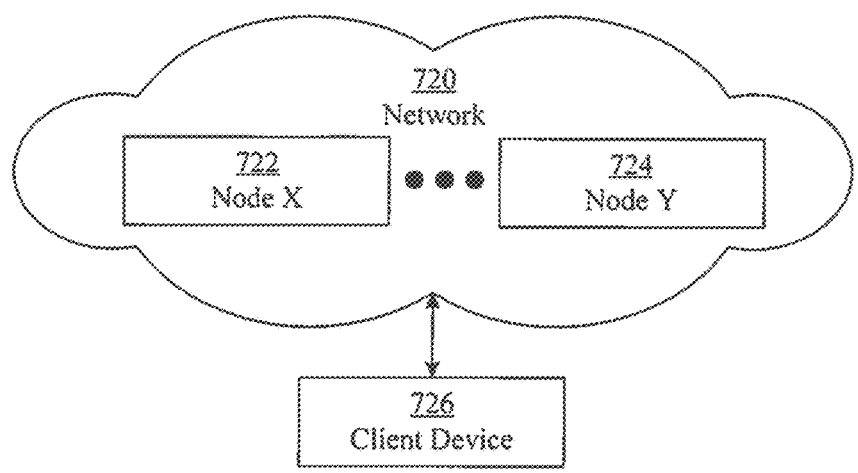
FIG. 7.2

SCREEN SHARING MANAGEMENT

BACKGROUND

Computer networks are collections of computing devices that may communicate. Computer networks allow for communication between remote users, or users that are remote from each other. One technique for communication using a computer network uses screen sharing. In a screen sharing session, at least a portion of the display of the user's screen on one computing device is transmitted to another user's screen for display. Further, updates to the portion by a user are propagated to the other user's screen through the screen sharing session. Thus, both users may continually view the same portion of a display.

SUMMARY

In general, in one aspect, one or more embodiments relate to a method to manage screen sharing. The method includes receiving a screen sharing request of a shareable interface displayed on a first computing device of a first end user, conducting, in response to the session sharing request, an inventory of secured assets in the shareable interface, and generating a shared interface from the shareable interface. Generating the shared interface includes obtaining a first secured asset in the inventory of the secured assets, modifying the first secured asset based on a first end user permission defined for the first secured asset to generate a modified secured asset, and adding the modified secured asset to the shared interface. The method further includes transmitting the shared interface to a second computing device of a second end user.

In general, in one aspect, one or more embodiments relate to a non-transitory computer readable medium that includes computer readable program code. The computer readable program code is for receiving a screen sharing request of a shareable interface displayed on a first computing device of a first end user, conducting, in response to the session sharing request, an inventory of secured assets in the shareable interface, and generating a shared interface from the shareable interface. Generating the shared interface includes obtaining a first secured asset in the inventory of the secured assets, modifying the first secured asset based on a first end user permission defined for the first secured asset to generate a modified secured asset, and adding the modified secured asset to the shared interface. The computer readable program code is further for transmitting the shared interface to a second computing device of a second end user.

In general, in one aspect, one or more embodiments relate to a system for managing screen sharing that includes a computer processor, a data repository that relates secured assets to a corresponding end user permission, and instructions. The instructions, when executed on the computer processor, include a session manager for receiving a screen sharing request of a shareable interface displayed on a first computing device of a first end user, and transmitting a shared interface to a second computing device of a second end user. The instructions include an asset manager for conducting, in response to the session sharing request, an inventory of secured assets in the shareable interface, and generating the shared interface from the shareable interface. Generating the shared interface includes obtaining a first secured asset in the inventory of the secured assets, modifying the first secured asset based on a first end user permission defined for the first secured asset to generate a modified secured asset, and adding the modified secured asset to the shared interface.

Other aspects of the invention will be apparent from the following description and the appended claims.

BRIEF DESCRIPTION OF DRAWINGS

FIGS. 1.1 and 1.2 show a computing system in accordance with one or more embodiments of the invention.

FIGS. 2, 3.1, 3.2, and 4 show flowcharts in accordance with one or more embodiments of the invention.

FIGS. 6.1 and 6.2 show example screenshots in accordance with one or more embodiments of the invention.

FIGS. 7.1 and 7.2 show a computing system in accordance with one or more embodiments of the invention.

DETAILED DESCRIPTION

Figure 2:
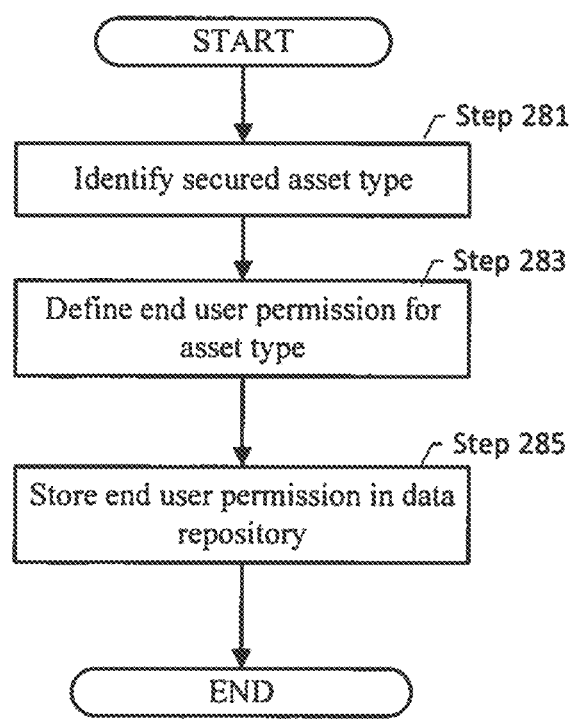

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing screen sharing between two devices. More specifically, embodiments of the invention conduct an inventory of secured assets in a shareable interface of a first end user. One or more of the secured assets may be modified and added to a shared interface that is generated from the shareable interface. The shared interface is transmitted to a second end user.

In one or more embodiments of the invention, each end user computing device and/or end user interface is subject to access control permissions that vary, to some extent, from the other. One or more embodiments are directed to using secured assets that are modified based on the specific access control requirements of the end user computing device and/or end user interface. Thus, one or more embodiments of the invention may enable the sharing or access of a shared screen while also accounting for certain access control restrictions.

FIGS. 1.1 and 1.2 show schematic diagrams of a system in accordance with one or more embodiments of the invention. FIG. 1.1 shows a system that includes an end user A computing device (100), an intermediary computing device (102), an end user B computing device (104). In general, a computing device (e.g., an end user A computing device (100), an intermediary computing device (102), an end user B computing device (104)) is any computing system discussed below with reference to FIGS. 7.1 and 7.2. Each of the computing devices in FIG. 1.1 is described below.

The end user computing device (e.g., end user A computing device (100), end user B computing device (104)) is any computing device used by an end user. An end user is a user that is sharing and/or viewing a shared screen. In particular, a user is an end user with respect to the screen sharing session. In some embodiments, the end user may not be an end user of the underlying software which is displayed on the screen at the time of the screen sharing. For example, the end user may be a user of purchased software, an administrator, a support technician, a developer, or any other user that is collaborating via the screen sharing.

In one or more embodiments of the invention, the end user A computing device (100) is any physical computing device that is used by an end user that is sharing the screen. In one or more embodiments, end user A computing device (100) includes a shareable interface (108) and an agent (106). The shareable interface (108) may be any interactive displayable user interface capable of being shared or duplicated on another display. In particular, the shareable interface (108) may be an entire display on the screen or a portion of a display on a screen. Thus, the shareable interface (108) may include the displayable portion of the user interface of one or more software application. By way of an example, the shareable interface may be an internet browser. By way of another example, the shareable interface may be the displayable portion of a financial application, an integrated development environment, another application, or any combination thereof.

In one or more embodiments of the invention, the shareable interface (108) may include one or more secured assets (110) and one or more general assets (112). An asset is any portion of the shareable interface (108). For example, an asset may be a displayed table, a field, a window, a link, a document, an image, or any other portion of the shareable interface.

A secured asset (110) is an asset that is protected from unauthorized access. In other words, a secured asset (110) may have a permission associated with the secured asset (110). For example, the permission may be that only end user A is authorized to read, write, and/or modify the secured asset. In one or more embodiments, whether an asset is a secured asset is defined by the underlying software application(s) presenting the shareable interface. The underlying software application is a software application that includes the executable code for generating the shareable interface. For at least one of the secured assets, the underlying software application defines whether the asset is secured, and may define the authorized end users that may access the asset as well as the type of access that is permitted. For example, if an underlying software application is a web-based financial application, the web-based financial application may have default parameters that specify the end user(s) who are authorized to access different types of secured asset. For example, the secured assets (110) may include the user's personally identifiable information, such as the user's social security number or date or birth. By way of another example, the secured asset may include a restricted page area within an internet browser. In some embodiments, end users may change the default parameters in the underlying software application(s). One or more embodiments provide a technique for an end user to define end user permissions for secured assets in the context for the purposes of screen sharing.

In one or more embodiments, secured assets are stored on a backend server (not shown) that is protected by a firewall. In some embodiments, end user B may not have permission to access the backend server. In some embodiments, end user B may have permission to access only a portion of data on the backend server that does not include the user's secured assets.

In one or more embodiments, secured assets are locally stored on end user A computing device (100). Further, in one or more embodiments, end user B does not have permission to access end user A computing device. One or more embodiments provide a technique for end user A to define end user permissions for secured assets in the context and for the purposes of screen sharing. For example, the screen sharing may bypass the security of the secured assets by the underlying software application. Further, end user A may control the sharing of the secured assets separately from the underlying software application in the screen sharing session.

General assets (112) are assets that are unrestricted and/or common amongst users. For example, general assets (112) may be general field names, photos, pages, or other assets. General assets may be accessible by each end user.

The agent (106) may be hardware, software, firmware or any combination thereof facilitates the management of information the shareable interface (108). In other words, the agent (106) is a portion of the system that executes on end user's A computing device (100). For example, the agent (106) may include functionality to conduct an inventory of secured assets and provide secured assets to the intermediary computing device (104) (discussed below).

Continuing with FIG. 1, the end user B computing device (104) is a receiver of the screen sharing session. In other words, end user B computing device (104) includes functionality to display a shared interface (126). The shared interface is a version of the shareable interface (108) that has the secured assets (110), which may or may not be modified. In other words, in one or more embodiments, the shareable interface is the interface that is being shared to another user (e.g., end user A). The shared interface is an interface that is received from another user (e.g., end user B). In one or more embodiments, one or more of the secured assets (110) in the shareable interface (108) are modified to create the shared interface (126). In one or more embodiments, general assets (112) may remain in the shared interface (126). Thus, the shared interface (126) is a continually updated copy of the shareable interface (108), but with one or more of the secured assets modified.

The end user A computing device (100) and the end user B computing device (104) is connected via a network (128). For example, the network may be the network described below with reference to FIGS. 7.1 and 7.2. Further intermediary computing device (102) may be communicatively interposed between the end user A computing device (100) and the end user B computing device (104) and also connected via the network (128).

In one or more embodiments of the invention, the intermediary computing device (102) may include a data repository (114), a security manager (118), a session manager (120), an asset manager (122) and a privacy platform (124). Each of these components is described below.

In one or more embodiments of the invention, the data repository (114) is any type of storage unit and/or device (e.g., a file system, database, collection of tables, or any other storage mechanism) for storing data. Further, the data repository (114) may include multiple different storage units and/or devices. The multiple different storage units and/or devices may or may not be of the same type or located at the same physical site. The data repository may include functionality to store end user permissions (e.g., end user A permissions (116)) and the secured asset lists (e.g., secured asset list A (130)).

The secured asset list (e.g., secured asset list A (130)) may include a list of secured assets and/or a list of secured asset types. The use of the term list is for explanatory purposes and not intended to denote a particular data structure. For example, the secured assets in the secured asset list may be identified by a unique identifier of the secured asset, whereby the unique identifier is unique amongst the secured assets. By way of another example, types of secured assets in the secured asset list may be identified by a unique identifier of the type of secured asset, whereby the unique identifier is unique amongst the types. The type may be indicative of a category of data (e.g., name, address, social security number, personal information, image, etc.).

The permissions (e.g., end user A permissions (116)) may be user defined (e.g., defined by user A) for one or more screen sharing sessions. For example, the permission may define the type of access (e.g., read, write, modify, etc.) and an identifier of the end user and/or the end user role that corresponds to the type of access. In one or more embodiments of the invention, the data repository (114) establishes a relationship or mapping between one or more end user permissions and one or more secured assets or secured asset types in the secured assets list. For example, the relationship may be that end user B has access to view end user A's social security number and end user C (not shown) does not have access. Although not shown in FIG. 1, the data repository may further relate the type of modification to perform with the mapping between the end user permission and the secured asset lists. For example, the data repository may store triples that include a field for the type of modification, at least one field for the permission, and a field for the unique identifier of the secured asset or the secured asset type.

Continuing with FIG. 1, the security manager (118) is hardware, software, firmware, or any combination thereof that includes functionality to perform authentication and authorization for end users. The security manager (118) may further include functionality to encrypt and decrypt communications with end users. Further, the security manager may include functionality to perform modifications on the secured asset. For example, the security manager may include functionality to transform the sharable interface to a shared interface for end user B.

The session manager (120) is hardware, software, firmware, or any combination thereof that includes functionality to establish and maintain a screen sharing session between at least two end users. Although FIG. 1 shows only two end users, the screen sharing session may be between more than two end users without departing from the scope of the invention. In one or more embodiments, the session manager (120) includes functionality to maintain the connection and end the connection.

The asset manager (122) is hardware, software, firmware, or any combination thereof that includes functionality to manage the secured assets. In particular, the asset manager (122) may include a user interface to guide a user through defining permissions for secured assets. The asset manager (122) may further include functionality to obtain an inventory of secured assets on the end user A computing device. The privacy platform (124) is a platform on which the above components of the intermediary computing device may execute.

Although FIG. 1.1 shows a single end user as providing the sharable interface, and one or more other end users as receiving the shared interface, multiple users may provide a shareable interface. In other words, whether an interface that is being shared is a shared interface or a shareable interface may be itemized on a per secured asset basis. In other words, the use of the terms shareable interface and shared interface may be based on perspective and defined with respect to the secured assets that are shared. For example, each end user may have secured assets that are private or controlled by the respective end user in the common interface.

By way of a more concrete example, consider the following scenario, at least two end users are accessing the same web application via a web browser. The two end users are in different roles defining the permissions of the respective end users. The neither set of permissions of a role is a subset of the other permissions. Thus, end user A has secured assets that are controlled by end user A in the shared interface and end user B has secured assets that are controlled by end user B. In the screen sharing session of the web application, portions of the common interface of the web application are controlled by end user A (i.e., part of the shareable interface of end user A and the shared interface of end user B) while, at the same time, portions of the common interface of the web application are controlled by end user B (i.e., part of the shareable interface of end user B and the shared interface of end user A). A similar technique may be applied where more than two end users are present and each end user has a portion which is being controlled by the end user. As used herein, a secured asset is controlled by an end user when the end user may define the permissions for other end users to access the secured asset.

FIG. 1.2 shows an embodiment for multiple end users to have secured assets that are controlled by the end user in the single screen sharing session. In FIG. 1.2, end user A computing device (200) includes agent A (206) and a common interface A (244). The common interface A (244) includes shareable interface A (208) with secured assets A (210), a shared interface (246). The common interface A (244) may include general assets (not shown), which may be in the shareable interface, the shared interface, and/or another portion. End user B computing device (204) includes agent B (250) and a common interface B (252). The common interface B (254) includes shareable interface B (256) with secured assets B (258), a shared interface (260). The common interface B (252) may include general assets (not shown), which may be in the shareable interface, the shared interface, and/or another portion. The shared interface (e.g., shared interface A (246), shared interface B (260)), the shareable interface (e.g., shareable interface A (208), shareable interface B (254)), agent (e.g., agent A (206), agent B (250)), secured assets (e.g., secured assets A (210), secured assets B (256)) may be the same or similar to similarly named components discussed above with reference to FIG. 1.1. Further, in FIG. 1.2, the shareable interface and the shared interface may be interleaved portions of the common interface, and/or within multiple sections of the common interface. In other words, the shareable interface and the shared interface may or may not be consecutive portions of the common interface.

The common interface (e.g., common interface A (244), common interface B (252)) is the same interface on each computing device, but rendered for the particular user. In other words, the secured assets and general assets are the same, and may be modified (e.g., by distortion) for the particular end user.

As with FIG. 1.1, each end user computing device in FIG. 1.2 is communicatively connected via a network (228) to intermediary computing device (202). The network (228) and the intermediary computing device (202) may be the same or similar as the network (128) and the intermediary computing device (102) discussed above with reference to FIG. 1.1.

Continuing with FIG. 1.2, in one or more embodiments of the invention, the intermediary computing device (202) may include a data repository (214), a security manager (218), a session manager (220), an asset manager (222) and a privacy platform (224) which may be the same or similar to the data repository (114), the security manager (118), the session manager (120), the asset manager (122) and the privacy platform (124), respectively, discussed above with reference to FIG. 1.1. Further, as shown in FIG. 1.2, the data repository (114) may have end user permissions (e.g., end user A permissions (262), end user B permissions (264)) and secured asset lists (e.g., secured asset list A (266), secured asset list B (268)) that is defined for the particular end user. In other words, end user A permissions (262) and secured asset list A (266) is defined for end user A, while end user B permissions (264) and secured asset list B (268) is defined for end user B. The end user permissions and secured asset lists for an end user in FIG. 1.2 may be the same or similar to the end user permission and secured asset lists discussed above with reference to FIG. 1.1.

System configurations other than those shown in FIGS. 1.1 and 1.2 may be used without departing from the scope of the invention. For example, various components may be combined to create a single component. As another example, the functionality performed by a single component may be performed by two or more components.

FIGS. 2, 3.1, 3.2, and 4 show flowcharts in accordance with one or more embodiments of the invention. The various steps of the flowcharts may be performed using the components discussed above with reference to FIGS. 1.1 and 1.2. Further, although the following flowcharts are described with respect to a single perspective, the operations may be performed using both perspectives to build a common interface as described above with reference to FIG. 1.2. While the various steps in the following flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart for defining permissions for secured assets in accordance with one or more embodiments of the invention. In Step 281, a secured asset is identified. In one or more embodiments of the invention, a user may select a secured asset in an interface of an underlying application that a user wants to establish in a screen sharing session. The secured asset that is selected may have a default permission or no permission already assigned to the secured asset. Further, identifying the secured asset may be to identify the type of the secured asset. In one or more embodiments of the invention, to identify the secured asset, the user may use the user interface of the asset manager on the intermediary computing device. In other words, the user interface of the asset manager may include user interface widgets that, when selected, corresponds to selecting particular secured assets and/or particular types of secured assets. Thus, via the user interface, a secured asset may be identified.

In Step 283, an end user permission for the asset type is defined in accordance with one or more embodiments of the invention. In one or more embodiments, using the user interface, the end user may select various user interface widgets and/or enter information into one or more fields, to specify permissions for other end users. The user may further specify whether the secured asset or secured asset type is distorted (e.g., by applying a blurring effect, replacing with a set of characters, or applying another distortion technique) for the other end user(s).

In Step 285, the end user permission is stored in a data repository in accordance with one or more embodiments of the invention. Thus, the storage relates the end user permission with the asset type in the secured asset list. Using the stored relationships, one or more embodiments may initiate a screen sharing session whereby secured assets are modified.

FIGS. 3.1 and 3.2 show flowcharts for generating and transmitting a shared interface in accordance with one or more embodiments of the invention. More specifically, FIG. 3.1 shows the general steps for generating and transmitting a shared interface, while FIG. 3.2 further details the process for generating a shared interface from the shareable interface.

Starting with FIG. 3.1, in Step 301, a screen sharing request is received in accordance with one or more embodiments of the invention. In one or more embodiments, an end user using an underlying software application may initiate a screen sharing request using the agent on the end user computing device. In particular, the agent may receive a request from the end user via a user interface of the agent. The agent may transmit the request to the intermediary computing device. In some embodiments, the screen sharing request may be initiated within the underlying software application, within a web browser, or within another component.

In Step 303, an inventory of the secured assets in the shareable interface is conducted in accordance with one or more embodiments of the invention. In one or more embodiments, the screen sharing request may specify the shareable interface. For example, the screen sharing request may specify the entire display, a portion of the display, or the underlying application. Thus, the agent identifies the secured assets in the shareable interface. The agent may perform the identification based on which secured assets are encrypted, or have another identifier indicating that the asset is a secured asset.

In Step 305, the shared interface is generated from the shareable interface in accordance with one or more embodiments of the invention. Generating a shared interface from a shareable interface may be performed on a per secured asset basis. For example, the system may iterate through the secured assets, processing each secured asset sequentially and/or in parallel with respect to other secured assets.

FIG. 3.2 shows a flowchart for generating the shared interface from the shareable interface by processing a secured asset. In Step 311 of FIG. 3.2, a first secured asset in the inventory of secured assets is obtained. The first secured asset may be any secured asset in the shareable interface. In one or more embodiments of the invention, the first secured asset may be obtained from the end user computing device having the shareable interface, a remote computing device, or another device. For example, the first secured asset may be downloaded from a remote computing device. In one or more embodiments of the invention, to obtain the secured asset the security credentials of the end user sharing the shareable interface are used. In other words, rather than using the security credentials of the receiver of the shared interface, the security credentials of the transmitting end user are used. Using the security credentials of the transmitting end user, a firewall of the remote computing device may be bypassed. Thus, because the underlying application allows the transmitting end user to access secured assets controlled by the end user, the system is able to obtain a copy of such secured assets.

In Step 313, the first secured asset is modified based on a first end user permission defined for the first secured asset to generate a modified secured asset. The end user permission defined by the end user having the shareable interface for the end user receiving the shareable interface is obtained. The end user permission may be further obtained based on the mapping to the secured asset. If the end user permission specifies to modify the secured asset, then the secured asset may be modified. For example, the modification may be to blur the first secured asset when the first secured asset is an image. By way of another example, the modification may be to distort the first secured asset, such as by blurring, changing characters or performing another distortion mechanism. In one or more embodiments of the invention, the shareable interface and shared interface is maintained and transmitted as a document object model (DOM). In such embodiments, modifying the secured assets in the shareable interface is to modify the DOM. For example, link elements may be replaced with actual versions of the secured assets in the DOM. By way of another example, the original version of an image or a field may be replaced by a distorted version in the DOM. Various mechanisms may be used to modify the secured asset without departing from the scope of the invention.

In accordance with one or more embodiments of the invention, the modified secured asset is added to the shared interface in Step 315. In one or more embodiments, the modified secured asset is added so as to be displayed at the same location as the unmodified secured asset in the shareable interface.

Returning to FIG. 3.1, in Step 307, the shared interface is transmitted to the second computing device of the second end user. Thus, the shared interface may be displayed on the second computing device of the second end user. In one or more embodiments, when an update is performed, only the updated portion is regenerated and transmitted to the second end user computing device. In one or more embodiments, when an update is performed, the entire shareable interface is transmitted to the second end user computing device.

Although FIGS. 3.1 and 3.2 show modifying secured assets, in some embodiments, some of the secured assets may not be modified. For example, an end user may provide another end user permission to view the secured asset in an unmodified form. In such a scenario, the secured asset is added to the shared interface without modification.

Figure 4:
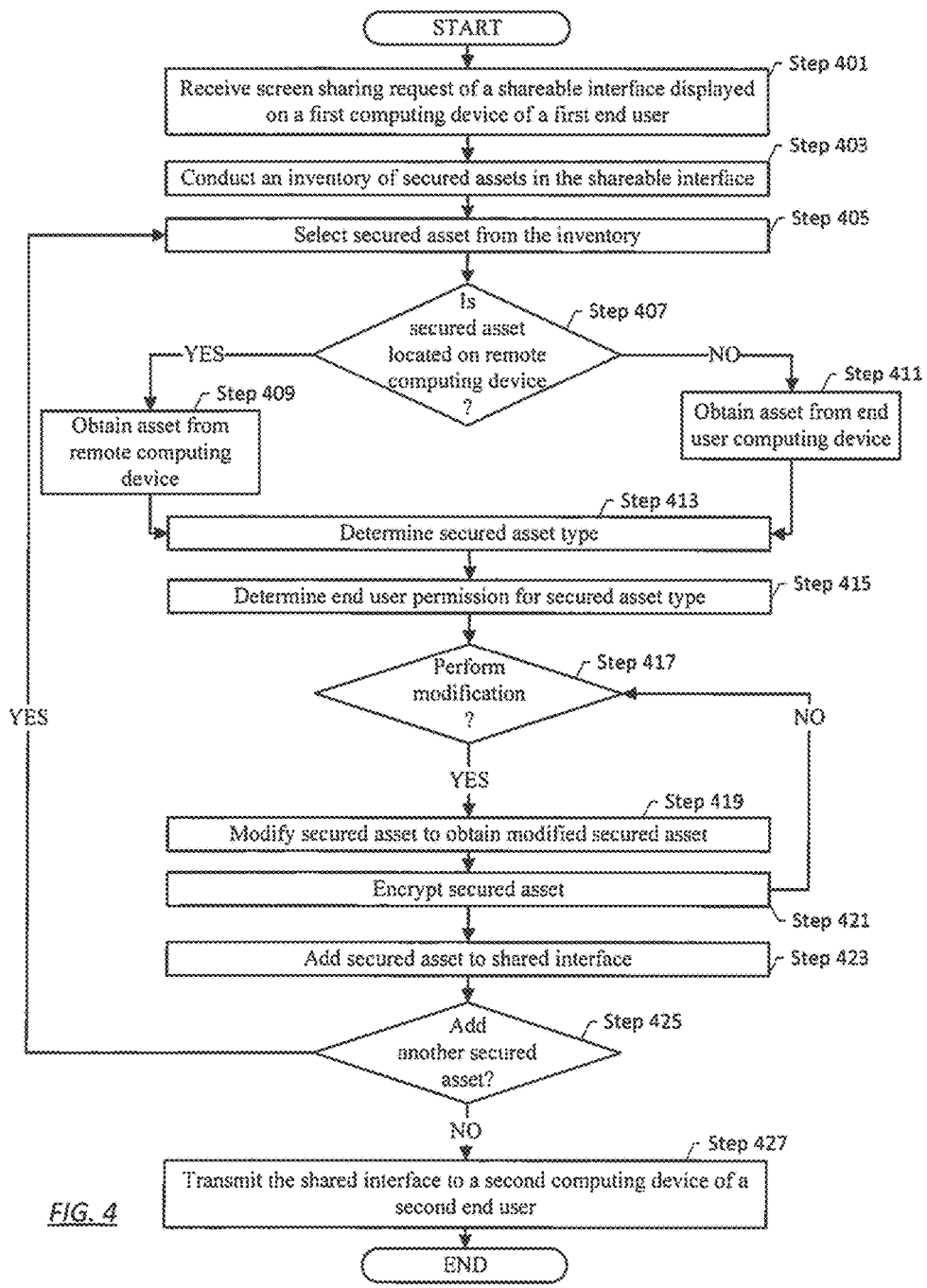

FIG. 4 shows another flowchart for screen sharing management in accordance with one or more embodiments of the invention. In Step 401, a screen sharing request, from a shareable interface displayed on a first computing device of a first user, is received. Step 401 may be performed in a same or similar manner discussed above with reference to Step 301 of FIG. 3.1. In Step 403, an inventory of the secured assets in the shareable interface is conducted. Step 403 may be performed in a same or similar manner discussed above with reference to Step 303 of FIG. 3.1.

In Step 405, a secured asset is selected from the inventory. The secured asset may be selected in virtually any manner and in virtually any order. In Step 407, a determination is made as to whether the secured asset is located on a remote computing device. In particular, a determination is made whether the secured asset is from a remote computing device that is remote from both the intermediary computing device and the end user computing devices. In one or more embodiments, a computing device may be deemed remote when the computing device is accessible only via the same network as interposed between the end user computing device and the intermediary computing device. In one or more embodiments, a computing device may be deemed remote when the computing device is located behind a firewall that does not protect the intermediary computing device. A firewall is a network security system that monitors and controls the incoming and outgoing network traffic based on predetermined security rules. Determining whether the secured asset is on a remote computing device may be performed based on determining that the secured asset is a link element. The link element is a reference to a location of a secured asset. If the link element is a virtual address of a location on a remote computing device that includes the secured asset, then the secured asset is deemed to be located on the remote computing device.

In Step 409, if a determination is made that the secured asset is located on a remote computing device, the secured asset is obtained from the remote computing device. In one or more embodiments, the end user credentials of the end user controlling the secured asset are used for authentication with the firewall protecting the remote computing device. Thus, the secured asset may be obtained without authenticating the end user receiving the shared interface to the remote computing device.

If the secured asset is not located on the remote server, the secured asset may be obtained from the end user computing device in Step 411. In other words, the agent may provide the secured asset to the intermediary computing device, such as from the file system of the end user computing device. Although FIG. 4 shows either Step 409 or 411 being performed, both Steps 409 and 411 may be performed without departing from the scope of the invention. For example, the end user computing device may obtain the secured asset from the remote computing device and the intermediary computing device may obtain the secured asset from the end user computing device. As another example, the intermediary computing device may obtain part of the secured asset from the remote computing device and other parts from the end user computing device.

After obtaining the secured asset, from the remote computing device and/or the end user computing device, the asset type of the secured asset is determined in Step 413. In Step 415, the end user permission for the asset type is obtained. Steps 413 and 415 may be performed by determining whether the secured asset matches a secured asset or type of secured asset in the list of secured assets. In other words, the data repository may be queried with a unique identifier of the secured asset or the secured asset type. The query may further include an identifier of the end user receiving the shared interface. The query may respond with a permission for the secured asset.

In Step 417, a determination is made as to whether a modification should be performed on the secured asset. In other words, a determination is made whether the secured asset should be modified based on the permission. For example, if the permission indicates that the user may not view the secured asset, then the modification is to distort the secured asset. If the permission indicates that the user may not modify the secured asset, then the secured asset is set as a static value in the shared user interface. If a modification should be performed on the secured asset, in Step 419, the secured asset is modified, resulting in a modified secured asset. If no modification is to be performed on the secured asset, or upon performing the modification defined by the permission, Step 421 is executed.

In Step 421, the secured assets are encrypted in accordance with one or more embodiments of the invention. In other words, the secured assets are encrypted based on a predefined encryption protocol with the end user receiving the shared interface. In Step 423, the secured asset is added to the shared interface. Step 423 may be performed in a same or similar manner discussed above with reference to Step 315 of FIG. 3.2. In Step 425, a determination is made as to whether another secured asset should be added. If another secured asset is to be added, Steps 405-425 may be repeated for the next secured asset as discussed above.

Continuing with FIG. 4, in Step 427, the shared interface is transmitted to a second computing device of a second end user. Transmitting the shared interface may be performed in a same or similar manner discussed above with reference to Step 307 of FIG. 3.1.

The following examples are explanatory purposes only and are not intended to limit the scope of the invention. The following is an example technique for generating a shared interface in a co-browsing session in accordance with one or more embodiments of the invention. Before co-browsing, the private link elements (e.g., <link>) and image elements (e.g., <img>) are selected. The private link and image elements may be filtered to ensure only private elements are selected. For link elements, an AJAX GET request is made to download the contents of cascading style sheets (css) file linked to by the <link> element. The contents are then stored in a string. For image elements, an HTML5 canvas tag is created and an Image( ) is created with its source set to the same source as the img tag. When the image loads, the canvas is then used to export the image data as a base64 encoded PNG string. In the example, the link elements are rewritten, in the shared interface, as style elements with the content of the css file that were previously downloaded. The img elements are rewritten with the image elements' source (src) attribute set to the base64 PNG string that was previously generated. Co-browsing begins. While co-browsing, since the private elements are now encoded in the HTML DOM, the secured assets may be streamed just like any other element.

Figure 5:
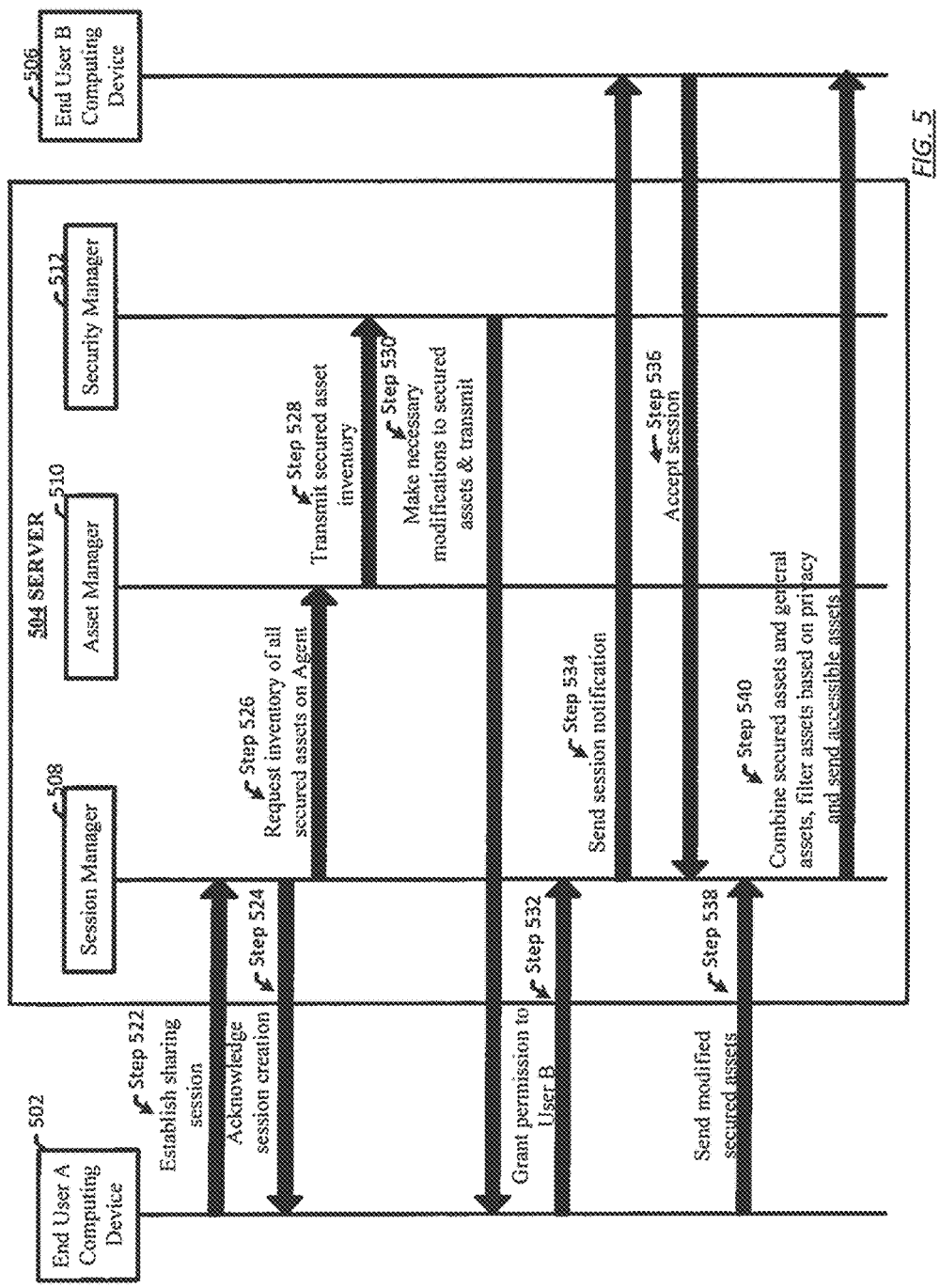
FIG. 5 shows an example timing diagram in accordance with one or more embodiments of the invention.

FIG. 5 shows an example timing diagram in accordance with one or more embodiments of the invention. In the example timing diagram, an end user A computing device (502) communicates with a server (504), which communicates with end user B computing device (506). The server (504) includes a session manager (508), an asset manager (510), and a security manager (512). In Step 522, end user A computing device (502) establishes a screen sharing session and sends a request to the session manager (508). In Step 524, the session manager (508) sends an acknowledgment of the session creation request. In Step 526, the session manager (508) requests, from the asset manager (510), an inventory of all of end user A's secured assets. The asset manager (510) conducts the inventory and obtains the secured assets from either a remote computing device or from the end user A computing device (502).

In Step 528, the asset manager (510) transmits the inventory of secured assets to the security manager (512). In Step 530, the security manager (512) determines the asset type for each of the secured assets in the inventory of secured assets. Based on the asset type, the security manager (512) then determines end user A's security permissions for each secured asset type. The security manager (512) then performs any modifications to the secured assets before transmitting the modified secured assets to user A.

In Step 532, end user A grants end user B permission to share end user A's screen. End user A computing device (502) notifies the session manager (508) of the permission grant. In Step 534, the session manager (508) then sends the permission grant to end user B computing device (506) and, in Step 536, user B sends an acceptance to the session manager. In Step 538, end user A computing device (502) sends the modified secured assets to the session manager (512). Upon receiving the modified secured assets from end user A computing device (502), as shown in Step 540, the session manager creates a shared screen that includes the modified secured assets controlled by end user A, as well as any general assets, filtered based on user A's privacy requirements per asset type. The assets are then transmitted to end user B computing device (506) as a shared screen.

FIGS. 6.1 and 6.2 show example screenshots of a screen sharing session using one or more embodiments described herein. In the example, an end user, Jane Doe, is requesting remote assistance with a tax software program, from a technical support representative. FIG. 6.1 shows the user's shareable interface (600). As shown in the shareable interface, the user's secured assets and the general assets associated with the particular webpage of the tax software program are shown. For example, the social security number (602) and the image (604) of the end user are shown.

FIG. 6.2 shows the shared interface (610) received by the technical support representative. As shown in FIG. 6.2, using one or more embodiments described herein, the social security number (602) and the image (604) in FIG. 6.1 are modified by removing the image (614) and masking the social security number with dots (612) in FIG. 6.2. Thus, the technical support representative may see only the portion of the shareable interface that the end user authorizes the technical support representative to see. Further, in the example, secured assets, such as birthdate and occupation may be difficult for the technical support technician to obtain from the remote server hosting the web application with the tax software program. However, because the security credentials of the end user are used to access the remote server, the secured assets are able to be obtained and transmitted to the technical support technician in accordance with the permissions set by the end user.

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to manage screen sharing comprising:
receiving a screen sharing request of a shareable interface displayed on a first computing device of a first end user from a second computing device of a second end user;
maintaining the shareable interface as a document object model;
conducting, in response to the screen sharing request, an inventory of secured assets on the first computing device in the shareable interface;
generating a shared interface from the shareable interface, wherein generating the shared interface comprises:
obtaining a first secured asset in the inventory of the secured assets,
wherein the first secured asset is an image,
determining whether the first secured asset is located on a remote computing device,
downloading the first secured asset from the remote computing device when the first secured asset is determined to be located on the remote computing device,
wherein downloading the first secured asset from the remote computing device is in response to a link element in the document object model of the shareable interface,
obtaining the first secured asset from the first computing device when the first secured asset is not determined to be located on the remote computing device,
determining an asset type of the first secured asset,
determining a first end user permission for the asset type of the first secured asset,
determining whether to perform modification of the first secured asset based on the first end user permission,
modifying the first secured asset based on the first end user permission defined for the first secured asset to generate a first modified secured asset,
wherein modifying the first secured asset comprises blurring the image,
encrypting the first modified secured asset according to a predefined encryption protocol to generate an encrypted modified secured asset,
adding the encrypted modified secured asset to the shared interface by modifying the document object model of the shared interface,
determining whether a second secured asset should be added to the shared interface,
selecting the second secured asset from the inventory when the second secured asset should be added to the shared interface,
obtaining the second secured asset in the inventory of the secured assets,
obtaining a second end user permission defined for the second secured asset to generate a second modified secured asset,
adding the second secured asset to the shared interface without modification based on the second end user permission; and
transmitting the shared interface as the document object model to the second computing device of the second end user,
wherein the encrypted modified secured asset and the second secured asset are displayed by the second computing device.

2. The method of claim 1, wherein the shareable interface is in a browser.

3. The method of claim 1, wherein the first secured asset is obtained from the first computing device.

4. The method of claim 1, wherein modifying the first secured asset comprises distorting the first secured asset.

5. A non-transitory computer readable medium comprising computer readable program code for:
receiving a screen sharing request of a shareable interface displayed on a first computing device of a first end user from a second computing device of a second end user;
maintaining the shareable interface as a document object model;
conducting, in response to the screen sharing request, an inventory of secured assets on the first computing device in the shareable interface;
generating a shared interface from the shareable interface, wherein generating the shared interface comprises:
obtaining a first secured asset in the inventory of the secured assets, wherein the first secured asset is an image, determining whether the first secured asset is located on a remote computing device, downloading the first secured asset from the remote computing device when the first secured asset is determined to be located on the remote computing device, wherein downloading the first secured asset from the remote computing device is in response to a link element in the document object model of the shareable interface, obtaining the first secured asset from the first computing device when the first secured asset is not determined to be located on the remote computing device, determining an asset type of the first secured asset, determining a first end user permission for the asset type of the first secured asset, determining whether to perform modification of the first secured asset based on the first end user permission, modifying the first secured asset based on the first end user permission defined for the first secured asset to generate a first modified secured asset, wherein modifying the first secured asset comprises blurring the image, encrypting the first modified secured asset according to a predefined encryption protocol to generate an encrypted modified secured asset, adding the encrypted modified secured asset to the shared interface by modifying the document object model of the shared interface, determining whether a second secured asset should be added to the shared interface, selecting the second secured asset from the inventory when the second secured asset should be added to the shared interface, obtaining the second secured asset in the inventory of the secured assets, obtaining a second end user permission defined for the second secured asset to generate a second modified secured asset, adding the second secured asset to the shared interface without modification based on the second end user permission; and transmitting the shared interface as the document object model to the second computing device of the second end user, wherein the encrypted modified secured asset and the second secured asset are displayed by the second computing device.

6. The non-transitory computer readable medium of claim 5, wherein the shareable interface is in a browser.

7. The non-transitory computer readable medium of claim 5, wherein the first secured asset is obtained from the first computing device.

8. A system for managing screen sharing comprising:

a first end user computing device comprising a computer processor;

a second end user computing device comprising a computer processor;

a data repository that relates secured assets to a corresponding end user permission; and a server comprising:

a session manager for:
receiving a screen sharing request of a shareable interface displayed on a first computing device of a first end user from a second computing device of a second end user,
maintaining the shareable interface as a document object model, and
transmitting a shared interface as the document object model to a second computing device of a second end user, and an asset manager for:
conducting, in response to the screen sharing request, an inventory of secured assets on the first computing device in the shareable interface, and a security manager for:
generating the shared interface from the shareable interface, wherein generating the shared interface comprises:
obtaining a first secured asset in the inventory of the secured assets,
wherein the first secured asset is an image,
determining whether the first secured asset is located on a remote computing device,
downloading the first secured asset from the remote computing device when the first secured asset is determined to be located on the remote computing device,
wherein downloading the first secured asset from the remote computing device is in response to a link element in the document object model of the shareable interface,
obtaining the first secured asset from the first computing device when the first secured asset is not determined to be located on the remote computing device,
determining an asset type of the first secured asset,
determining a first end user permission for the asset type of the first secured asset,
determining whether to perform modification of the first secured asset based on the first end user permission,
modifying the first secured asset based on the first end user permission defined for the first secured asset to generate a first modified secured asset, wherein modifying the first secured asset comprises blurring the image,
encrypting the first modified secured asset according to a predefined encryption protocol to generate an encrypted modified secured asset,
adding the encrypted modified secured asset to the shared interface by modifying the document object model of the shared interface,
determining whether a second secured asset should be added to the shared interface,
selecting the second secured asset from the inventory when the second secured asset should be added to the shared interface,
obtaining the second secured asset in the inventory of the secured assets,
obtaining a second end user permission defined for the second secured asset to generate a second modified secured asset,
adding the second secured asset to the shared interface without modification based on the second end user permission,
wherein the encrypted modified secured asset and the second secured asset are displayed by the second computing device.

9. The system of claim 8, wherein the instructions further include functionality to execute:
   a security manager configured to manage the corresponding end user permission of the first end user.

10. The system of claim 8, further comprising:
    an agent for executing on the first end user computing device and interfacing with the session manager.

\* \* \* \* \*